March 5, 1968　　　　　　　A. WELTI　　　　　　3,371,887
APPARATUS AND METHOD FOR GUIDING A FIRST TRAVELLING BODY
RELATIVE TO A SECOND TRAVELLING BODY
Filed March 23, 1966　　　　　　　　　　　　　　5 Sheets-Sheet 1

United States Patent Office 3,371,887
Patented Mar. 5, 1968

3,371,887
APPARATUS AND METHOD FOR GUIDING A FIRST TRAVELLING BODY RELATIVE TO A SECOND TRAVELLING BODY
Arno Welti, Zurich, Switzerland, assignor to Albiswerk Zurich A.G., Zurich, Switzerland, a corporation of Switzerland
Filed Mar. 23, 1966, Ser. No. 536,833
Claims priority, application Switzerland, Mar. 26, 1965, 4,244/65
11 Claims. (Cl. 244—3.11)

ABSTRACT OF THE DISCLOSURE

A first tracker tracks a first travelling body to continuously obtain the coordinates of the travel path points of the first body and to provide the coordinates as first path data. A first memory records the first path data pointwise in accordance with the coordinates thereof. A second tracker separate from the first tracker tracks a second travelling body to continuously obtain the coordinates of the travel path points thereof and to provide such coordinates as second path data. A second memory separate from the first memory records the second path data pointwise in accordance with the coordinates thereof. A data processor connected to the first and second memories seeks in the path of travel of the second body a point having a predetermined coordinate in a given relation to the same coordinate of a point in the path of travel of the first body and provides guidance commands from other coordinates of the same points in the paths of travel of the first and second bodies. The guidance commands are then transmitted to the first body.

---

My invention relates to guidance systems. More particularly, it relates to a method and apparatus for guiding a first moving structure such as a missile relative to a second moving structure such as an airborne vehicle or other target.

Among the known techniques for guiding a first moving structure to cause its collision with a second moving structure, essentially two of these techniques are of a fundamental nature, viz.:

(1) The remote control of a moving vehicle from a spatially remote guidance site.
(2) The target seeking self-guidance of a vehicle.

A typical example of the remote control technique is to effect guidance of the vehicle by the transmission of commands. In such technique, a first target tracking radar is employed to continuously measure the spatial position of a target such as a moving airborne vehicle and a second target tracking radar is used to continuously determine the spatial position of a guided vehicle such as a defensive missile. The measurement data, respectively furnished by both radars, are compared in suitable computing apparatus, the result of this comparison operating to provide guidance commands for the guided vehicle, command transmitting equipment being employed to transmit the latter commands to the guided vehicle.

The aforementioned guidance commands are determined at the remotely located guidance station relative to the travel motion of the reflection gravity center of the guided vehicle.

In guidance by commands systems located at a remote fixed station, a significant disadvantage presented thereby is the need for the substantial space requirements and costly equipment required for control station installation. Although in this type of technique, the guided vehicle need only be provided with relatively simply receiving equipment, it still requires relatively complicated and large space consuming self-controlling apparatus, i.e. gyros, to maintain the vehicle stabilized on its travel course.

In the aforementioned target seeking self-guidance technique, the guided vehicle is steered to the target on a guiding beam. In this technique, the target vehicle is continuously tracked by a target tracking radar similar to the tracking of the target vehicle in the command-response guidance system. The measured data obtained thereby are supplied to suitable computing apparatus to provide an output therefrom which, in turn, controls a guiding beam transmitter. The guided vehicle (hereinafter termed a missile, for convenience, whether a rocket, airplane, or other airborne structure is involved) is at first located with a relatively coarse beam of the guiding beam transmitter and is then guided by a bunched fine beam from the transmitter. With this technique, there is determined the target-covering curve relative to the path of travel of the guided missile, i.e., the guiding beam transmitter, the missile and the target are situated on a straight line at any given moment. The disadvantages presented in the use of the target self-seeking guidance technique are the need for the missile to be capable of high transverse accelerations and the requirement for the missile to be provided with good self-steering or stabilizing equipment.

In the foregoing description of techniques for guiding a missile toward a moving target, the following principle of operation is common to both, i.e., from an observation point, the spatial positions of the target and missile, which are to collide with each other, are determined with suitable coordinates. These coordinates data are used to compute the spatial angles, $\theta$, between the two travel paths, such computation being continuous. From this computation, the continually changing course of the missile is determined. It has been found that a collision between the missile and target vehicle will occur only if this angle $\theta$ is, at least, momentarily constant, i.e., $d\theta/dt=0$. The latter equation also constitutes the fundamental guidance condition for a collision.

To enable the determining of this angle $\theta$ from the spatial measurements data, the target vehicle and the guided vehicle must remain extremely stable on their respective paths of travel. Thus, for example, if an airplane is the moving target and it is to be hit by a defensive missile, since the airplane will inherently fly on its course with sufficient stability, the missile has to be provided with accurately stabilized gyro planes. These gyro planes are quite difficult to stabilize because, among other factors, the measuring of the gyro planes draws energy from the gyros whereby the uniform travel is affected, which results in an uncontrollable precession of the gyro axis.

Accordingly, it is an important object of my invention to provide a guidance apparatus and method which reliably effects either a collision, anti-collision, or other directed course relative to a moving body and which requires only a relatively small amount of equipment in the guidance station and in the self-controlling or self-steering equipment.

It is another object to provide a guidance apparatus and method in accordance with the preceding object wherein the aforesaid reliable guidance can be effected even with a relatively low precision of the measuring system which is employed.

These objects are achieved by tracking the target vehicle and the missile with respective separate tracking apparatus, in accordance with a feature of my invention, and the course data obtained thereby are stored pointwise with coordinates in respective memory devices. In addition, a point is sought in the course of the target vehicle of which a predetermined coordinate is in a given relationship to the corresponding coordinate of a point in the course of the missile. The guidance commands for the missile are derived from the relationship between the other course coordinates.

To effect a collision between the missile and the target vehicle, the missile is supplied with guidance commands only when the other course coordinates are not in the same given relationship. The guidance commands are chosen such that each coordinate of the travel point of the missile by itself converges toward a value which has a given relationship to the corresponding coordinate of a travel point of the target vehicle. For effecting an anti-collision course, the coordinates of one of these two travel points are used with a time delay relative to the true constellation for collision.

In accordance with the invention, there is provided apparatus for guiding a first travelling body relative to a second travelling body comprising first tracking means for tracking the first body to obtain the distance, lateral angle and elevational angle coordinates of the points of the path of the first body and second tracking means for tracking the second body to obtain the distance, lateral angle and elevational angle coordinates of the points of the path of the second body. First memory means are included in the apparatus for receiving and storing the first body path point coordinates and second memory means are included for receiving and storing the second body path point coordinates and for reading the distance coordinates of the second body path. There are further provided first correlating means to which the outputs of both of the memory means are fed to place the distance coordinates of the respective bodies' path points in the relationship $$\frac{\text{distance coordinate of second body}}{\text{distance coordinate of first body}}$$

and means responsive to the output of the first correlating means for causing the distance coordinates to be read in the second memory means to locate a point on the second body path such that the aforesaid distance coordinates relationship is made constant. Second correlating means are included in the apparatus for receiving the respective outputs of both of the memory means and placing the lateral angle coordinates of the respective constant relationship distance coordinate points in the relationship, lateral angle of the second body path point-lateral angle coordinate of the first body path point. There is further provided third correlating means for receiving the respective outputs of both memory means and placing the elevational angle coordinates of the aforesaid constant relationship distance coordinate path points in the relationship, elevational angle coordinate of second body path point-elevational angle coordinate of first body path point. Means are included for differentiating with respect to time, the resulting outputs of the aforesaid second and third correlating means, and means are also provided for transmitting the differentiated outputs to the first body as correction commands for the path thereof, such transmitting being continued until the differentiated outputs are equal to zero.

The foregoing and more specific objects and features of my invention will be apparent from, and will be mentioned in, the following description of the apparatus and method for guiding a first travelling body relative to a second travelling body shown by way of example in the accompanying drawing.

Prior to describing the structure and operation of the invention, it is believed to be of aid in the understanding thereof to analyze the three-dimensional events leading to the collision of two moving bodies by first discussing the two-dimensional events which lead to a collision in a plane.

Thus, considering binocular viewing, the geometric loci of all points from which the lines of sight extend fall upon corresponding retinal points in both eyes whereby a single point external to the eyes is seen as a single point. Such geometric loci are known as "horopters" for sight in the horizontal direction, a different horopter obtains for each different distance which is observed. All of the horopters for viewing in the same plane conjointly form a group or family of circles having a common chord.

Figure 1:
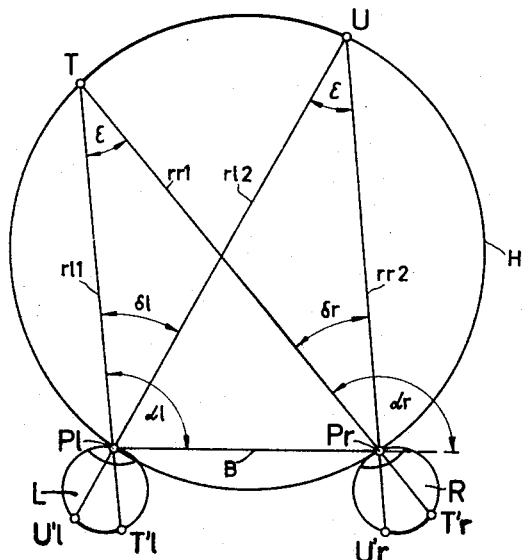
FIG. 1 is a diagram convenient for explaining a so-called horopter for binocular viewing.

In this connection, there are represented in FIG. 1, the pupils $Pl$ and $Pr$ of the two eyes L and R respectively, the pupils being at the terminal points of a straight line B. A circular horopter H is drawn with line B as a chord. The two points T and U on horopter H appear on the retina of eye L as points $T'l$ and $U'l$ and appear on the retina of eye R as points $T'r$ and $U'r$. The line of sight $rr1$, i.e. line $Pr$–T and the extension of line B form the side angle $\alpha r$. The line of sight $rl1$, i.e. line $Pl$–T and line B form the side angle $\alpha l$. The geometry which applies in FIG. 1 is the one which relates to peripheral angles which have their apices on a circle and whose legs form a common chord. Accordingly, it is believed unnecessary to furnish the proof of the relationships of the angles $\alpha l$ and $\alpha r$ as side angles between the line B and the legs of a periphery angle, and the angles $\delta l$ and $\delta r$ as the angles respectively between the two lines of sight $rl1$ and $rl2$ and the two lines of sight $rr1$ and $rr2$.

The angles $\delta l$ and $\delta r$ provide the azimuth of the corresponding retinal locations $U'l$ and $U'r$. The most important relation in the circular horopter resides in the invariance of its angles:

$$\delta l - \delta r = 0 \qquad (1)$$

According to the theorem of the externals of a triangle, the difference between the side angles at the chord B is constant:

$$\alpha l - \alpha r = \Delta\alpha = \text{constant} \qquad (2)$$

If the periphery point U is considered to be a travelling point on the horopter, then by forming the first time differential, Equation 2 can be related to 0, as follows:

$$(\alpha l - \alpha r)\cdot = (\Delta\alpha)\cdot = 0 \qquad (3)$$

These invariant relationships are the conditions for a device with two viewing organs as a unity of two viewing directions (community of viewing directions).

Effectively, this signifies that the invariants of a unit of two target directions, i.e., a community of target directions of a device having two viewing directions, i.e., a double viewing organ, places the instantaneous intersection of the lines of sight $rl$ and $rr$, as the common target of both viewing organs, onto peripheral points of a family or a group of circles. Consequently, the chord B and corresponding lines of sight fixedly determine a triangle which may be termed a convergence triangle. The concept of the horopter thus provides the conditions for a collision of two vehicles in space in the viewing community of a device having two viewing organs.

Figure 2:
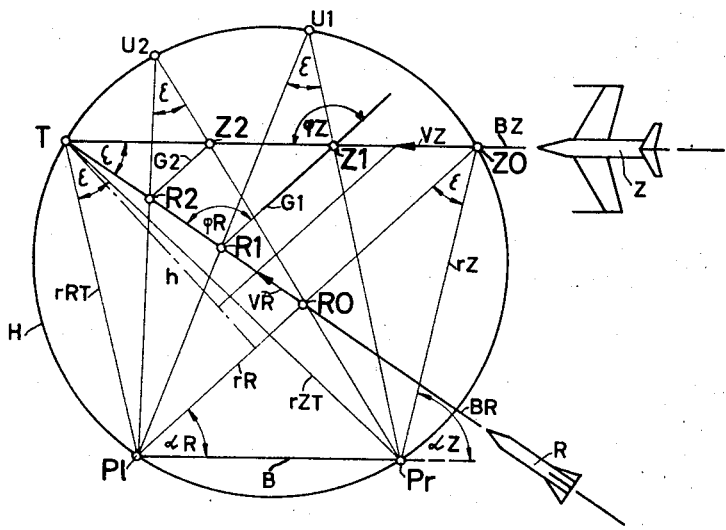
FIG. 2 is an explanatory diagram with regard to the geometry and target collision relative to a circular horopter.

In the diagram shown in FIG. 2, the two points $Pl$ and $Pr$ may be considered to represent locations analogous to pupils of two target devices, a family of circles being located through these points. The straight line BZ represents a linear path of a target Z and the straight line BR is taken to be a linear path of a guided missile R. Lines BZ and BR intersect at a point T. The three points $Pl$, $Pr$ and T thus define the horopter H from the family of circles.

It is known that the collision course of two linearly uniformly travelling objects is characterized by the fact that their travel paths form the legs of an angle $\epsilon$ whose vertex is the collision point T and that the connecting straight lines G1 and G2 between the instantaneous positions of the two objects Z1, R1 or Z2, R2 form with the angles $\varphi Z$ and $\varphi R$ similar triangles relative to the legs of angle $\epsilon$, i.e., the so-called collision triangles.

The geometric-kinematic formulation of the condition for collision as an invariant of the direction at the collision triangle is as follows: The difference between the projections of the instantaneous velocity vectors VZ and VR of the two respective vehicles, i.e., target and missile, at the height $h$ of the instantaneous collision is to be regulated down to zero at any given moment, i.e.:

$$\epsilon = \varphi Z - \varphi R \quad (4)$$

and $$VZ \sin \varphi Z - VR \sin \varphi R = 0 \quad (5)$$

The instantaneous angle between the straight lines $Pl$-$Pr$ represents the station base B and the angles of the target lines, designated by the notations $rZ$ and $rR$, bear the notations $\alpha Z$ and $\alpha R$ respectively. The above set forth equations for the geometrical relations obtaining in a collision as an invariant of the direction at the collision triangle of two vehicles Z and R and the collision condition as an invariant of the convergence of two viewing targets at the circular horopter can be expressed as follows:

$$\epsilon = \alpha Z - \alpha R = \text{constant} \quad (6)$$

and $$\epsilon = \varphi Z - \varphi R = \text{constant} \quad (7)$$

Accordingly, it further follows from the similarity of the triangles that $$VZ/VR = rZ/rR = rZT/rRT = \text{constant} \quad (8)$$

The collision triangles Z0, R0, T and Z1, R1, T having an apex at collision point T and the principal convergence triangle $Pl$, $Pr$, T are similar triangles. Consequently, the lengths of the legs Z0–T and R0–T as well as the lengths of the main lines of sight $Pl$–T and $Pr$–T are similar to each other. It is thus seen therefrom that the ratio of the vehicle speeds $VR:VZ$ at any moment is continuously contained in the ratio of the distances $rR:rZ$ from the pupil points $Pl$ and $Pr$ to the viewing targets Z, R. This relationship constitutes a further invariant, i.e., the invariant of similarity in the progress of a collision course.

If at this point in the explanation, the condition of a straight and uniform movement is removed, then, with reference to the geometric-kinetic relationship of the objects, the term "collision triangles" is no longer appropriate. However, a definition is again provided if the course tangents and the instantaneous connecting lines between the two vehicles R and Z are taken as constituting instantaneous triangles or as presumed collision triangles.

Figure 3:
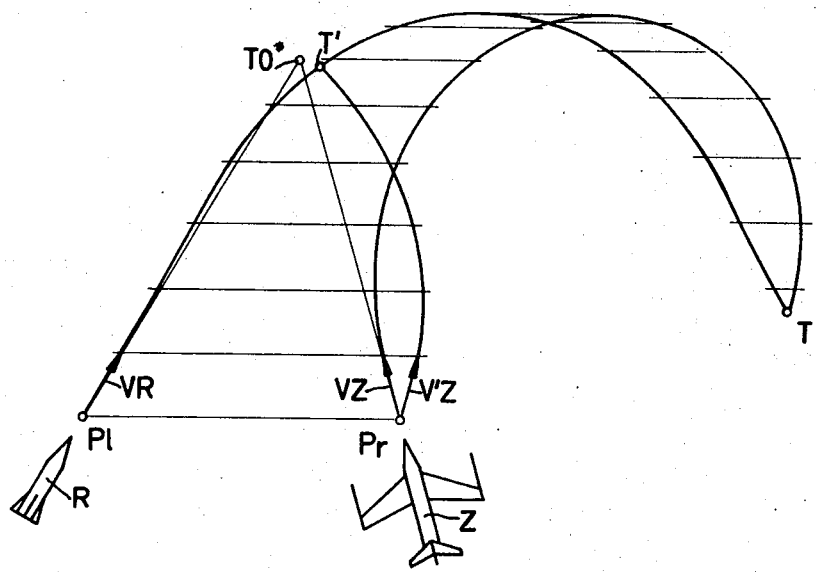
FIG. 3 is also an explanatory diagram and relates to target collision in a plane at uniform travel.
Figure 4:
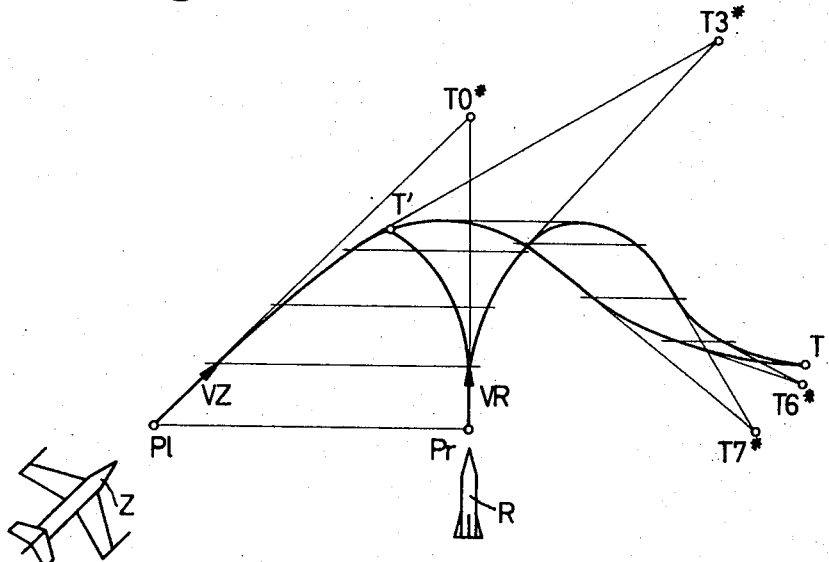
FIG. 4 is a diagram conveniently employed to explain the target collision in a plane at any uniform travel velocity for the lowest velocity of a guided vehicle which results in collision.

In this latter connection, the diagrams depicted in FIGS. 3 and 4 represent the general events which ensue up to the occurrence of a collision between two vehicles with reference to such presumed collision triangles. In this regard, each presumed collision triangle is repeated in the homolog unit of two viewing directions of a device having two viewing organs as the main convergence triangle of the viewing targets at the circular horopter. A given main covergence triangle has as its apex a presumed collision point on the periphery of a given circle. The apices of all possible main conversion triangles are located on the peripheries of a family of homolog circles which have in common as a chord, the line B. These homolog circles form a group or family which constitutes a first homolog geometric-kinetic image of a general series of events up to the collision point. The common invariant is that of convergence. Thus, the concept of the invariant of convergence is given a broader meaning. If, now, the ratio of speeds of the vehicles is presumed to be constant, then the invariant of similarity remains preserved, and the adjacent sides of the presumed collision triangles above the distance B exhibit a constant ratio. In the homolog unit of two viewing directions, the presumed collision triangles are repeated in the form of main convergence triangles having a constant ratio of the main viewing lines. Consequently, the presumed collision points move along the peripheries of a family of circles while preserving the ratio of the triangle sides. A circle which is the geometric locus of all triangle apices having the same base and having a constant legs ratio is the Apollonic circle. Consequently, the apices of all the main convergence triangles are located on a family of the Apollonic circles which can be drawn above a given length of a straight line for a given division ratio of the triangle sides. The family of the Apollonic circles constitutes a homolog geometric-kinematic image of the events leading up to the collision, i.e., the invariant similarity.

The family of Apollonic circles as a manifold representation of the invariants of similarity, and the family of the circular horopters as a manifold representation of the invariants of convergence jointly form a meshwork of circles intersecting each other at right angles.

Referring now to FIG. 3, the diagram depicted therein relates to the collision of two vehicles R and Z which respectively travel at uniform speeds on curved paths. The vehicle 6, depicted as an airplane, travels at the velocity VZ. A missile R is guided to collision in accordance with the above-described invariant conditions and travels at the velocity VR. The oncoming flight of aircraft Z in the illustrated direction and the flight of missile R meet at the presumed collision point T0*. In accordance with the invariant of similarity, the tips of the respective velocity vectors are always located on straight lines which are parallel to the base $Pl$–$Pr$ whereby only the velocity vector VZ need be continuously plotted on the flight path $Pr$–T and lines parallel to the base $Pl$–$Pr$ are to be drawn through the tips of the vectors. The same procedure is to be correspondingly followed with the velocity vector VR. Thereby, there results the path $Pl$–T for the defensive missile R.

In FIG. 3, a second velocity vector V'Z is shown in order to indicate that, with a uniform travelling speed but a symmetrical in-flight with respect to the first velocity vector VZ vis-à-vis a vertical axis through the line $Pl$–$Pr$ at the point $Pr$, a collision is also to be expected without changing the travel direction of missile R. In this case, the collision occurs at point T'.

In the diagram shown in FIG. 4, an added assumption is made. The in-flight of the aircraft Z takes place at point $Pl$ of the velocity vector VZ. The missile R, starting from point $Pr$, is presumed to have a velocity vector VR of a value such that the invariant condition is just still satisfied. Consequently, the velocity vector VR of the rocket has to be perpendicular to the base $Pl$–$Pr$ at the pont $Pr$. The manner of construction illustrated in FIG. 3 results in the two paths $Pr$–T and $Pr$–T'. The presumed collision points T0*, T3*, T6* and T7* are the intersection points of the course tangents at the corresponding instantaneous, invariable course points.

Based upon the above-presented considerations, there can be provided a guidance system which reliably results in collision, or anticollision, or other desired course of the guided vehicle relative to a second travelling vehicle. Such guidance system is described with reference to the assumptions diagrammatically represented in FIG. 5.

Figure 5:
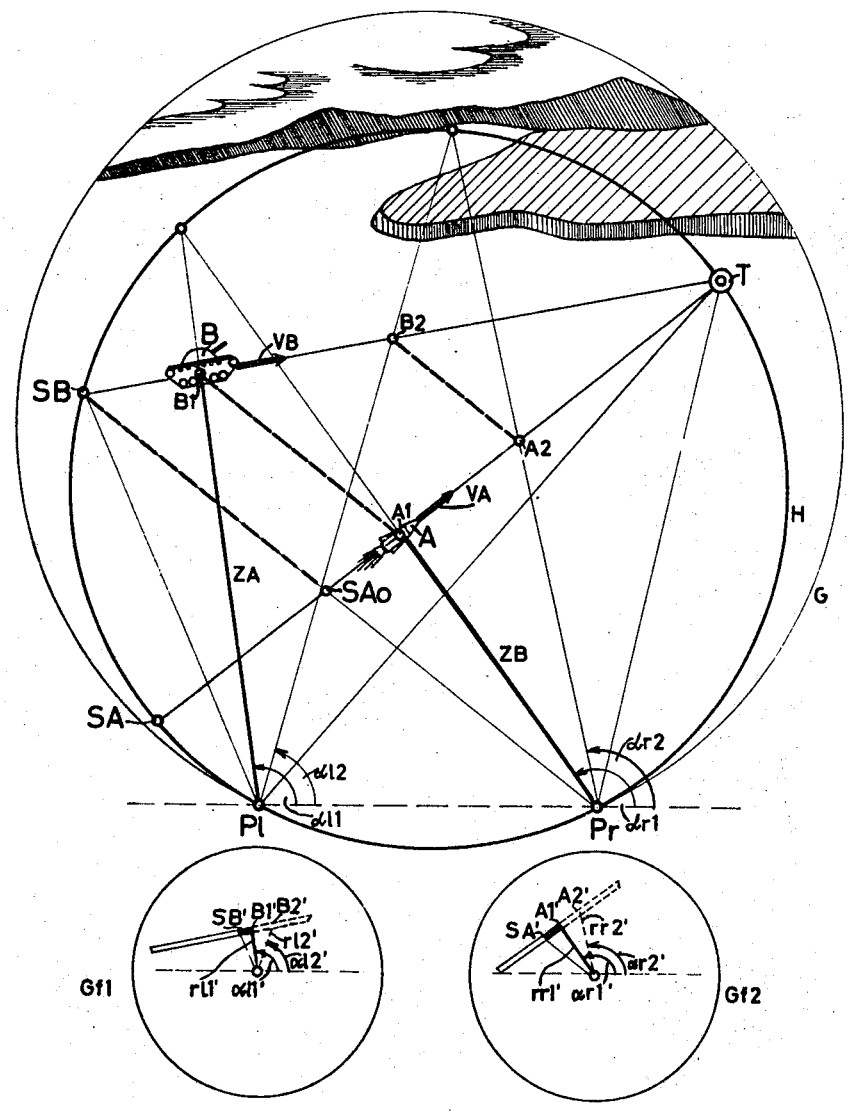
FIG. 5 is an explanatory diagram relating to target collision in a plane with a uniform linear travel in a circular horopter and employing a travel course measuring performance in accordance with the invention.

In FIG. 5, the circle G may conveniently represent the viewing field of an observer whose viewing organs are located at the points P$l$ and P$r$. The presumed courses of two vehicles such as a tank B and a guided missile A intersect at point T. It is further assumed that the hoopter passing through the points P$l$, P$r$ and T has been converted by a homological conversion to a circle H. In order to have the entire collision operation occur in the illustrated horopter H, the vehicle travel lines SA–T and SB–T are linear and the velocities VA and VB are uniform. For collision, the invariance conditions $$rA/rB = \text{constant} \quad (9)$$

and $$\alpha l - \alpha r = \Delta \alpha = \text{constant} \quad (10)$$

wherein $r$ and $\alpha$ are viewing-field coordinates have to be satisfied.

With these invariance conditions, the main convergence triangle SB, S00, T and the instantaneous collision triangles A1, B1, T and A2, B2, T can be determined. Actually, however, the assumption made with reference to the conditions diagrammatically depicted in FIG. 5 has to be created by the guidance system itself, since such a constellation will occur in nature only in exceptional cases.

With the condition that, in the courses previously travelled by the two vehicles, a point has been already located which satisfies the invariance condition, the necessary instantaneous guidance commands can be derived as follows.

There will continuously occur constellations which can be supplemented to a constant value:

$$rA/r'B = \text{constant}; \quad (rA/r'B)\cdot = 0 \quad (11)$$

and $$(\alpha l - \alpha' r) = \Delta' \alpha = \text{constant}; \text{ and } (\Delta' \alpha)\cdot = 0 \quad (12)$$

wherein $r$ and $\alpha$ denote viewing-field coordinates and $r'B$ and $\alpha'r$ denote viewing-field coordinates from a previously travelled point of the vehicle B. The term $(rA/r'B)\cdot$ denotes the differential quotient $$\frac{d}{dt}\left(\frac{rA}{r'B}\right)$$

The attaining of the conditions to satisfy Equations 11 and 12 solves the target-collision problem utilizing equipment possessing two viewing organs. To effect such attainment, the coordinates of all travel points of the two paths have to be continuously measured and stored. The latter is readily achieved in a simple manner by tracking each vehicle separately with a target tracking apparatus. Thus, for each instantaneous travel point of one vehicle such as missile A, for example, a point is sought on the path of the other vehicle, i.e., tank B, whose coordinates will supplement the coordinates of the instantaneous travel point to result in the constant value according to the Equations 11 and 12. Since it would be technologically difficult to seek a travel point at which all of the coordinates are supplemental to the constant value, it is practicable to seek a point of which a predetermined coordinate, $r'$ for example, has the above-mentioned relationship to the same coordinates of the instantaneous travel point. The guidance command then is derived from the other coordinates, so that the missile tends to travel toward a point at which all of the coordinates are in the above-mentioned relationship to a travel point of the tank. When this travel point is reached, the two vehicles will collide.

At constant velocities and straight travel paths of the two vehicles, the presumed collision point T on the horopter H is the future collision point of the vehicles. If in the paths of one or both of the vehicles, one or both of the path components are changed, then a new presumed collision point has to be sought by seeking on the memorized path of the tank B, a new point whose coordinates satisfy the invariance conditions together with the coordinates of the path travelled by the missile A. Once this new presumed collision point is available, a new horopter is determined in which the collision will take place provided that there is no further change in the path components. Of course, this new horopter no longer need exhibit the same shape as the one previously determined but may constitute any other conical section.

There are shown in FIG. 5 at the two observer localities, P$l$ and P$r$, two circles G$f1$ and G$f2$, each of which represents the memory field. The path points of both vehicles A and B are represented point by point in this memory field with regard to all of the coordinates employed with the aid of the target axes ZA, ZB. Thus the points B1' and B2' stored in memory field G$f1$ correspond to the path points B1 and B2 respectively of vehicle B. The points A1' and A2', memorized in the memory field G$f2$, correspond to the respective path points A1 and A2 of the vehicle A. To each of these stored path points in this example, there are assigned a coordinate $r$ and a coordinate $\alpha$.

Offhand, nothing can be predicted about a possible collision from the course of these two memorized paths in comparison with the real paths. Only the achieving of the invariance between a point of the memorized path of vehicle A and a point of the memorized path of vehicle B indicates that the two points, at constant components, constitute a collison course.

It could happen, however, that missile A is shot in a direction which does not include any points to enable the forming of the invariant condition. In this situation, there is merely required the extending of the memorized paths beyond the starting points SB' and SA'. This extension can be freely chosen such that, in any event, it contains two appropriate points.

The diagram depicted in FIG. 5 may also be conveniently utilized to explain anticollison. As has been hereinabove explained, for collison, a point on each travel path is sought relative to which the invariants between the path data are such that the two paths constitute a collision course. Now, if one of the two path points satisfying the invariance condition is shifted in time, the effect of such shifting is tantamount to shifting the path to which this point appertains homologously in space and time. Consequently, two vehicles which had previously been travelling on a collision course are now reliably set on an anticollison course.

Figure 6:
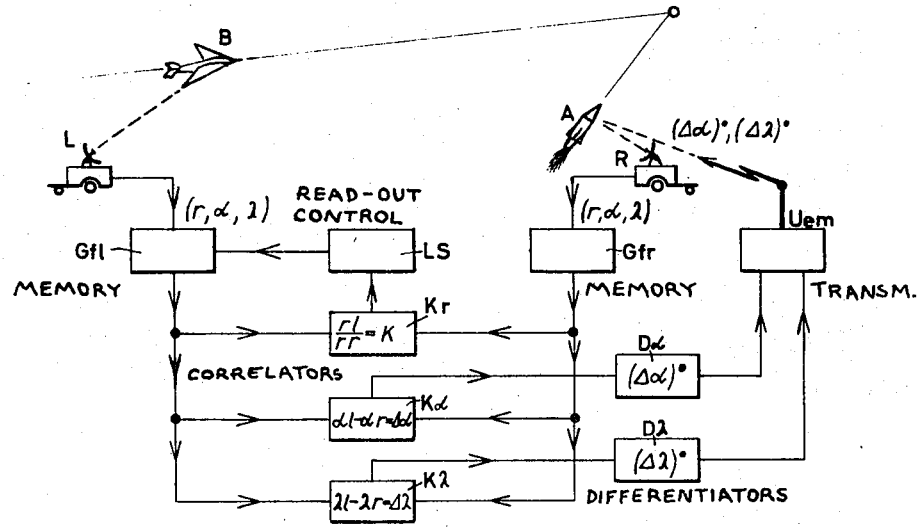
FIG. 6 is a block diagram of an illustrative embodiment of a system constructed in accordance with the principles of the invention and employing two target tracking apparatus.

With the above explanation borne in mind, reference can now be made to FIG. 6 wherein there is depicted in block diagram, an illustrative embodiment of a system constructed in accordance with the principles of the invention, the embodiment shown in FIG. 6 comprising two target tracking apparatus.

In the depiction shown in FIG. 6, the travelling body B is assumed to be a target airplane which is to be hit by the missile A. The target airplane B is continuously tracked with a tracking radar L and missile A is also tracked with a radar R. The data relative to the respective travel paths are ascertained in the respective radar apparatus by the coordinates: distance $r$, lateral angle $\alpha$ and angle of elevation $\lambda$. These coordinates data are entered into memories G$fl$ and G$fr$ for the respective paths of the target and the missile. A first correlator K$r$ is provided in which the coordinates $rr$, read out of memory G$fr$, and the coordinates $rl$, read out of memory G$fl$, are computationally placed in the relationship $rl/rr$ to fulfill the Equation 9 set forth hereinabove. Since the latter ratio normally does not correspond to the prescribed relationship set forth in Equation 11:

$$\left(\frac{rl}{rr}\right)\cdot = 0$$

an output is produced from correlator K$r$ which is applied to a read-out control stage LS, such output being a command applied to memory G$fl$ through stage LS to cause the reading device in memory G$fl$ to return to the starting point of the memory until a point on the path of aircraft B is found which satisfies the prescribed relationship to the instantaneous path point of missile A.

The other coordinates $\alpha$ and $\lambda$ of these two path points, read out of memories G$fl$ and G$fr$ respectively, are entered into two correlators K$\alpha$ and K$\lambda$. In correlator K$\alpha$, the respective $\alpha$ coordinates are placed into the relationship $\alpha l - \alpha r = \Delta \alpha$ and in correlator K$\lambda$, the respective $\lambda$ coordinates are placed into the relationship $\lambda l - \lambda r = \Delta \lambda$, the latter relationship being in accordance with the hereinabove set forth Equation 10. The output $\Delta \alpha$ from correlator K$\alpha$ is applied to a differentiation stage D$\alpha$ and the output $\Delta \lambda$ of correlator K$\lambda$ is applied to a differentiation stage D$\lambda$ to produce the respective time differentials of these correlator outputs, viz. $(\Delta \alpha)\cdot$ and $(\Delta \lambda)\cdot$. The latter differentials are fed to a transmitter U$em$ which is suitably a transmitter that transmits the values of the differentials as commands to missile A. In missile A, appropriate control members are actuated by the latter commands and its course is correspondingly corrected to produce a new constellation in the memorized paths. The search for two corresponding points is repeated and such search may result in new values for the correction of the missile's path. The search continues until the respective instantaneously memorized path points of missile A satisfy together with the previously memorized path point of aircraft B, the conditions according to the hereinabove set forth Equations 11 and 12, i.e.:

$$(rl/r'r)\cdot=0, \quad (\alpha l - \alpha' r)\cdot=0, \quad (\lambda l - \lambda' r)\cdot=0$$

At this juncture, target aircraft B and missile A travel on a collison course. By continuous comparison of the path coordinate in correlators K$r$, K$\alpha$ and K$\lambda$, each course change of one of the two bodies is instantaneously taken into account. Under the effect of control, missile A tends always to resume a course for collison with aircraft B. Such course, although possibly subject to variation by external factors such as disturbances in the missile's steering mechanism or by gusts of wind, is always readjusted to a new collision point.

Figure 7:
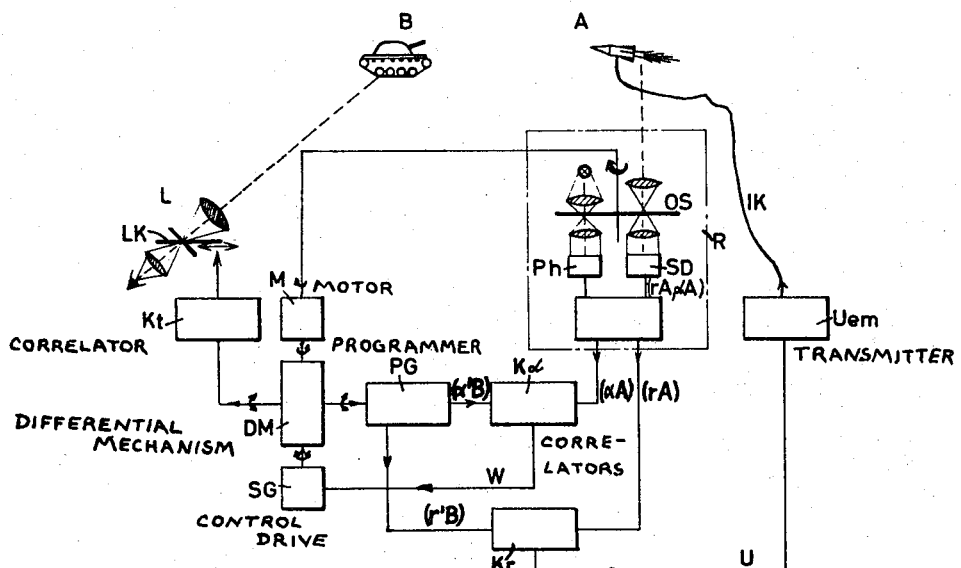
FIG. 7 is a block diagram of another embodiment of a system according to the invention which is suitable for simplified requirements.

In FIG. 7, there is shown an embodiment according to the invention in which various practical assumptions can be made to enable its relatively simple design. In this embodiment, the target body is shown to be a tank B and the guided body is a missile A. The guidance command to missile A is for it to hit moving tank B. Tank B is tracked by apparatus L which is an optical aiming device. The apparatus R for tracking missile A is an infrared radiation responsive device. Tracking apparatus R includes a scanning disc OS which is designed to produce a sinusoidal signal at infrared radiation detector SD in response to the impinging of such radiation thereon, the amplitude of the sinusoidal signal, which is a function of the coordinate $r$ and the phase position relative to a reference signal produce by a photocell P$h$, being indicative of the angle $\alpha$ between a reference direction and the direction of the coordinate $r$ in the scanned field of the tracking device R. Since scanning discs such as disc OS are well known for employment in infrared locating techniques, it is deemed unnecessary for them to be described in further detail. In this connection, reference may be had, for example, to "Infrared Physics and Engineering," Jamieson, McFee, Plass, Grube and Richards, published by the McGraw-Hill Book Company, Inc., New York, at Chapter 14 thereof.

By forming an image of tank B with the aid of an optical sighting device L, which is continuously aimed at tank B, the coordinates determined by device L, under ideal aiming conditions, are always constant relative to the image field. The coordinates of the points of the path travelled by tank B are then apparent from the tilting position of optical sighting device L. Therefore, with regard to tracking, tank B can be taken to be identical with its image B' in the image area of optical sighting device L. The coordinates of this image B' are:

$$B'(ro, \alpha o)$$

The data B' $(ro, \alpha o)$ need not be constant but may be chosen in advance for each position of tank B in a manner such that they can be correlated to the value "constant" or "zero" in any instantaneous position as required by the hereinabove set forth Equations 11 and 12. In this case, the coordinates may suitably be designated as B'$(r'B, \alpha'B)$.

The data B'$(ro, \alpha o)$ indicate the instantaneous position of the target. Equations 11 and 12 can thus be expressed as follows hereinbelow, the data pertaining to missile A in the scanned field of device R being denoted by the terms $rA$ and $\alpha A$:

$$ro'/rA = \text{constant}; \quad (ro'/rA)\cdot = 0 \qquad (13)$$

$$(\alpha o' - \alpha r) = (\Delta'\alpha) = \text{constant}; \quad (\Delta'\alpha)\cdot = 0 \qquad (14)$$

Optical sighting device L is provided with a filament cross LK which has to coincide with the target image B' of tank B. If the tracking of tank B is effected such that target image B' always moves along the ordinate, then the data of the target image coinciding with the filament cross point LK are termed $B'(ro, \alpha o = 90°)$, as mentioned hereinabove. The actual geometric locus of all path points for missile A which satisfies the conditions of Equations 13 and 14 is constituted by a cone whose apex is located at the target point. The shortest path of missile A in pursuit of the target is a line of any possible shape on such a cone. The latter facts permit the setting up of a program for the point located on the periphery of the horopter which constitutes an intersection of the target path with the path of the missile. Such a program is freely selectable insofar as a most favorable pursuing path can be set (FIG. 5) for a known firing location SA of missile A and the known station localities of the two tracking devices L and R. In this situation, the term "favorable" is intended to signify a path which comes as close as is feasible to the actual collision course.

Such a program can be set up in a relatively simple manner. It has been stated hereinabove that the path data, measured with infrared searching or tracking apparatus R, are available in the form of a sinusoidal oscillation. This phenomenon is suggestive of correspondingly representing the program by a sinusoidal oscillation whose amplitude and phase position are variable and conjointly furnish the programmed data, B'$(r'B, \alpha'B)$. Consequently, in a circuit network of the guidance control system, two sinusoidal oscillations have to be processed relative to their respective amplitudes and their relative phase positions. The information provided by the program and the information from optical sighting device L thus has to satisfy the conditions prescribed by Equations 13 and 14. Accordingly, a regulating signal is "zero" when the differential quotient of the phase displacement between the signals continuously furnished from infrared tracking device R and those furnished by the running program has the value of "zero." This means that the correlation condition for the data B'$(r'B, \alpha'B)$ and A'$(r'A, \alpha'A)$ to be compared with each other must be satisfied at the phase angle "zero."

The latter correlation condition is, however, only rarely attained, particularly at the beginning of the travel path, and may not be attainable in the event of external influences causing a change in the travel path. Consequently, there remains a residual quantity which is evaluated as the regulating signal W. This regulating signal acts upon the program in a manner so as to adjust path data representing an artificially produced constellation of tank B and missile A. The values corresponding to this constellation in the program are time-displaced relative to the true constellation. This time displacement in the program effects a change in the program by shifting the time point of the collision event. This displacement in the program has to be conformed in the guidance system in order for the collision to actually occur simultaneously with the collision of the programmed path and the optical image B' of the target B.

To satisfy the conditions required for such a conformed displacement, the sighting filament cross LK, which up to this point has constituted the coordinates B'(ro, αo), is displaced in the image field of the optical sighting device L by a movement dependent upon the instantaneous time position of the program.

The observer at the optical sighting device L thus obtains the impression that the target shifts non-uniformly and that he must continuously compensate for these apparently unsteady movements.

The system depicted in FIG. 7 enables the guiding of a missile A for collision with a target such as tank B in accordance with the hereinabove-explained assumptions and requirements.

Thus, tank B is continuously kept in sight by optical device L. As has been mentioned, a displaceable filament cross LK is provided in the image plane of device L. Missile A is tracked with infrared radiation responsive tracking apparatus R.

To control filament cross LK, there is provided in the system of FIG. 7, a time correlator K$t$ which receives information from a differential mechanism DM. Differential mechanism DM is driven by a motor M and by a control drive SG. Motor M operates to drive the scanning disc OS of tracking apparatus R. Another drive of differential mechanism DM controls a programmer PG. Programmer PG produces information as to the path of missile A in the form of a sinusoidal oscillation whose amplitude and phase position constitute the variable data. The latter sinusoidal oscillation is applied to an amplitude correlator K$r$ and a phase angle correlator K$α$. The sinusoidal wave generated in tracking device R in response to infrared radiation impinging thereon is also applied to amplitude correlator K$r$ and phase angle correlator K$α$. The output of correlator K$α$ provides information relative to phase angle difference according to Equation 14, such information being supplied to control drive SG. The output of amplitude correlator K$r$ is information in accordance with Equation 13, this output being applied to a transmitter U$em$ which, in this arrangement, transmits the correlated amplitude information as guidance commands to missile A, suitably through a cable IK.

In the event that tracking devices R and L measure the positions of target B and missile A respectively in terms of polar coordinates, a coordinate transformer may be provided either in transmitter U$em$ or in missile A to transform the polar coordinates to Cartesian coordinates.

If it is so desired, missile A may directly evaluate the polar coordinates by being operated with only a command-controlled elevation control. Such arrangement would require the providing for roll control or stabilization in the missile itself and signalling information as to the position of the rocket in space to be sent back to the transmitter apparatus U$em$.

It is to be emphasized that no absolute measuring operations are to be performed in the entire guidance system but that only the instantaneous path points are employed to effect guidance control whereby any errors in the measuring instrumentalities continually correct themselves.

Figure 8:
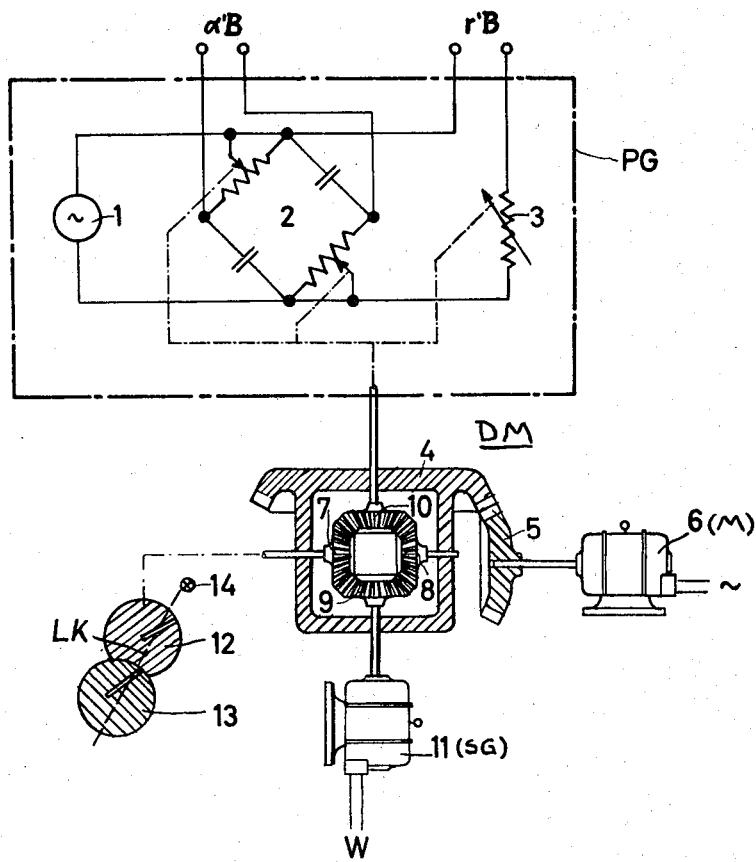
FIG. 8 shows a circuit diagram and a section of the mechanical equipment of an analog device suitable for use in a system according to the invention.

To further explain the function of the guidance control system in the arrangement of FIG. 7, reference is now made to FIG. 8 wherein there is shown an example of a differential mechanism DM, and embodiments of the programmer PG, the control drive SG, the coupling relation of the motor M, the time correlator K$t$ and the filament cross LK.

In FIG. 8, the programmer PG, suitable for use in a system as shown in FIG. 7, comprises an alternating current source 1, a phase shifter 2 and a variable resistor 3. Differential mechanism DM comprises a differential gearing which includes a crown gear 4 that meshes with a pinion gear 5, pinion gear 5 being driven by a motor 6 corresponding to the motor M of FIG. 7. Two conical gears 7 and 8 are provided which are journalled on crown gear 4, gears 7 and 8 being in meshing engagement with a pair of drive gears 9 and 10. A motor 11 is provided, corresponding to control drive SG in the arrangement of FIG. 7 for driving gear 9. Drive gear 10 is connected to the sliders on the variable resistors in phase shifter 2 and with the slider on variable resistor 3 in programmer PG. Gear 7 is connected to the sighting cross LK which in the arrangement shown in FIG. 8 is constituted only by a bright spot at the intersection of the slots of a slotted disc 12 and a slotted mask 13 respectively.

The aforementioned bright spot is produced with a lamp 14 and an optical lens system (not shown). The shifting of the position of the bright spot is effected with the employment of slotted disc 12 and slotted mask 13 for this purpose. Only disc 12 is rotatably journalled and rotationally displaceable by its connection to gear 7 of differential mechanism DM. Slotted mask 13 is rigidly affixed to optical sighting device L. Since motor 6 corresponds to motor M of the system of FIG. 7, it is energized by a constant supply voltage. Motor 11 which corresponds to control drive SG in the system depicted in FIG. 7 is energized by a voltage 11 generated in the phase angle correlator K$α$.

As has been explained hereinabove, the running time of the program is adjustable. The normal timing of the program is effected by constant-speed motor 6, i.e. motor M. In addition, the phase angle correlator K$α$, when it provides a regulating signal voltage W to motor 11, i.e., control drive SG, accelerates or decelerates the program until there is reached a given point in the program at which the regulating signal is zero.

If it is assumed that up to the point of occurrence of a chosen constellation, no regulating signal is generated, such operation would indicate that the time arrangement of the program coincides with actuality. Any departure from this program has to be apparent at the program point. The end point of the program, however, is the cross LK in the optical sighting device L which is represented by the bright spot and is continuously caused by the observer to coincide with the target image B' (ro, αo). Consequently, any change in programming caused by the regulating signal W is observable at the image B' of the target.

The displacement of the target by the regulating signal W is effected as follows: Motor 6 continuously rotates gear 4 in the same sense. Without the application of any regulating signal W to motor 11, motor 11 remains de-energized and gear 9 is rotated uniformly with gear 4. At this juncture, the two gears 7 and 8 of the differential mechanism are stationary whereby gear 10 is likewise rotated with driven gear 4. The program issuing from programmer PG proceeds uniformly because of the rotation of driving gear 10 and slotted disc 12 remains stationary in front of fixed slotted mask 13 whereby the marking of the end point of the program remains immovable. If at this point, a regulating signal W is generated in phase angle correlator K$α$, whether such signal is due to external influences on missile A or by changes in the guidance system, motor 11 will be rotated in one or the other direction. This latter rotation causes driving gear 9 to rotate gear 7 and a modification of the rotation of driving gear 10. Consequently, the program is varied and slotted disc 12 is rotated. The marking of the end point of the program is optical sighting device L is thus given a movement in conformance with the change in the program timing. The target image B' and the marking of the end point of the program now become shifted relative to one another. The observer located at optical sighting device L interprets this shifting as a modified travel path of the target which, as has been already explained hereinabove, constitutes a new constellation. This new constellation manifests itself in that the filament cross LK, i.e., the moving bright spot, again has to be made to coincide with the target image B'.

The various correlators, which are employed, are depicted in block form and are well known. Accordingly, further detailed description thereof is deemed unnecessary. In this connection, the amplitude correlator Kr, for example, may comprise a linear rectifier. The radii r of the path data to be compared, viz., B'(r'B, α'B) of the running program and the data A(r'A, α'A) of the rocket A, are contained in the amplitudes of the two respective alternating currents, i.e., in the alternating current from the program transmitter and in the alternating current from the tracking apparatus R produced in response to the infrared radiation impinging thereon. A simple rectification of the two alternating currents separately and a subsequent comparison of their amplitudes result in the producing of the relationship required by equation 13:

$$rA/r'B = \text{constant}; \quad (rA/r'B) \cdot = 0$$

The use of such a simple correlator is enabled only if the rectifiers and the amplitude comparator therein are not required to furnish exact data but if it is sufficient to merely ascertain whether or not a regulating signal is present. In the absence of such regulating signal, a constant value is attained for the ratio of the amplitude. In contrast thereto are those conditions which obtain when a regulating signal exists and which, by the guidance control of missile A, is gradually reduced to zero. If the regulating signals from the two correlators Kr and Kα are simultaneously zero, the necessary correlation conditions are simultaneously satisfied and the two bodies travel on a collision course.

It will be obvious to those skilled in the art upon examining this disclosure that apparatus and methods for guiding a first travelling body relative to a second travelling body according to my invention permit of a great variety of modifications and hence can be given embodiments other than those particularly illustrated and described herein without departing from the essential features of my invention and within the scope of the claims annexed thereto.

I claim:

1. Apparatus for guiding a first travelling body relative to a second travelling body comprising
    first tracking means for tracking said first body to continuously obtain the coordinates of the travel path points of said first body and to provide such coordinates as output signals, said first tracking means comprising means for continuously obtaining the distance, lateral angle and elevational angle cordinates of the points of the path of said first body;
    second tracking means for tracking said second body to continuously obtain the coordinates of the travel path points of said second body and to provide such coordinates as output signals, said second tracking means comprising means for obtaining the distance, lateral angle and elevational angle coordinates of the points of the path of said second body;
    data handling means responsive to the output signals of said tracking means for determining the ratio of the value of a chosen coordinate of said second body to the value of said corresponding chosen coordinate of said first body and for comparing the tracking angles of said first and second bodies, the ratio of the values of the chosen coordinates being such that for each path point on one path wherein a determined condition is met a path point is sought on the other path, said data handling means comprising first memory means for receiving and storing said first body path point coordinates, second memory means for receiving and storing said second body path point coordinates and for reading out the distance coordinates of said second body path points, memory output responsive means responsive to the outputs of said first and second memory means for determining the ratio of the value of said second body path point distance coordinates to the value of said first body path point distance coordinates, means responsive to said ratio value for causing the selection of a second body path point, the value of whose distance coordinate causes said ratio to have a constant value, means for comparing the lateral angles of said constant distance coordinates ratio path points and corresponding ones of the elevational angles of said constant distance coordinates ratio path points, and means responsive to deviations of said last named comparisons from respective constant values for providing corresponding guidance commands to said first body, said memory output responsive means comprising first correlating means to which the outputs of said first and second memory means are fed to place the distance coordinates of said respective bodies' path points in the relationship $$\frac{\text{distance coordinate of second body path point}}{\text{distance coordinate of first body path point}}$$

means responsive to the output of said first correlating means for causing said distance coordinates to be read in said second memory means to locate the coordinates of said point on said second body path such that said distance coordinates relationship is made equal to a constant, second correlating means for receiving the respective outputs of said memory means and placing said lateral angle coordinates of said constant relationship distance coordinate points in the relationship lateral angle coordinate of second body path point-lateral angle of first body path point, third correlating means for receiving the respective outputs of said memory means and placing said elevational angle coordinates of said constant relationship distance coordinate path points in the relationship elevational angle coordinate of said second body path point-elevational angle of first body path point, and means for transmitting the outputs of said second and third correlating means as guidance commands to said first body; and means responsive to a deviation from respective constant values for said ratio and said comparison for causing said first body to be changed in its path until a path is attained thereby in which said values are constant.

2. Apparatus for guiding a first travelling body relative to a second travelling body comprising
    first tracking means for tracking said first body to continuously obtain the coordinates of the travel path points of said first body and to provide such coordinates at output signals, said first tracking means comprising means for continuously obtaining the distance, lateral angle and elevational angle coordinates of the points of the path of said first body;
    second tracking means for tracking said second body to continuously obtain the coordinates of the travel path points of said second body and to provide such coordinates as output signals, said second tracking means comprising means for obtaining the distance, lateral angle and elevational angle coordinates of the points of the path of said second body;
    data handling means responsive to the output signals of said tracking means for determining the ratio of the value of a chosen coordinate of said second body to the value of said corresponding chosen coordinate of said first body and for comparing the tracking angles of said first and second bodies, the ratio of the values of the chosen coordinates being such that for each path point on one path wherein a determined condition is met a path point is sought on the other path, said data handling means comprising first memory means for receiving and storing said first body path point coordinates, second memory means for receiving and storing said second body path point coordinates and for reading out the distance coordinates of said second body path points, memory output responsive means responsive to the outputs of said first and second memory means for determining the ratio of the value of said second body path point distance coordinates to the value of said first body path point distance coordinates, means responsive to said ratio value for causing the selection of a second body path point, the value of whose distance coordinate causes said ratio to have a constant value, means for comprising the lateral angles of said constant distance coordinates ratio path points and corresponding ones of the elevational angles of said constant distance coordinates ratio path points, means responsive to deviations of said last named comparisons from respective constant values for providing corresponding guidance commands to said first body, first differentiating means for providing the time derivative of the output of said second correlating means, second differentiating means for providing the time derivative of the output of said third correlating means, read-out control means for receiving the output of said first correlating means, and a transmitter for receiving the respective outputs of said first and second differentiating means, said read-out control means being actuated to cause the insertion of said selected second body path point in said first correlating means, said transmitter transmitting said first and second differentiating means outputs as guidance commands to said first body, said memory output responsive means comprising first correlating means to which the outputs of said first and second memory means are fed to place the distance coordinates of said respective bodies' path points in the relationship $$\frac{\text{distance coordinate of second body path point}}{\text{distance coordinate of first body path point}}$$

means responsive to the output of said first correlating means for causing said distance coordinates to be read in said second memory means to locate the coordinates of said point on said second body path such that said distance coordinates relationship is made equal to a constant, second correlating means for receiving the respective outputs of said memory means and placing said lateral angle coordinates of said constant relationship distance coordinate points in the relationship lateral angle coordinate of second body path point-lateral angle of first body path point, third correlating means for receiving the respective outputs of said memory means and placing said elevational angle coordinates of said constant relationship distance coordinate path points in the relationship elevational angle coordinate of second body path point-elevational angle of first body path point, and means for transmitting the outputs of said second and third correlating means as guidance commands to said first body; and means responsive to a deviation from respective constant values for said ratio and said comparison for causing said first body to be changed in its path until a path is attained thereby in which said values are constant.

3. Apparatus as defined in claim 2 wherein said first and second tracking means are radar tracking systems.

4. Apparatus for guiding a first travelling body relative to a second travelling body comprising first tracking means for tracking said first body to continuously obtain the coordinates of the travel path points of said first body and to provide such coordinates as output signals, said first tracking means comprising an infrared radiation responsive device for obtaining the distance coordinate and phase position coordinate relative to a reference signal of the points of the path travelled by said first body;

second tracking means for tracking said second body to continuously obtain the coordinates of the travel path points of said second body and to provide such coordinates as output signals, second tracking means comprising an optical sighting device for obtaining the distance coordinate and phase position relative to said reference signal of a target image of the path points of said second body;

data handling means responsive to the output signals of said tracking means for determining the ratio of the value of a chosen coordinate of said second body to the value of said corresponding chosen coordinate of said first body and for comparing the tracking angles of said first and second bodies, the ratio of the values of the chosen coordinates being such that for each path point on one path wherein a determined condition is met, a path point is sought on the other path, said data handling means comprising programming means for providing a signal containing a given distance coordinate and a given phase position information, means for respectively comparing said given distance and phase position coordinates and said first body distance and phase position coordinates, means responsive to a deviation from a constant value of said phase position coordinates comparison to cause said image to shift in response thereto from a given target marking position, and means for transmitting the results of said distance coordinates information comparison as guidance commands to said first body; and means responsive to a deviation from respective constant values for said ratio and said comparison for causing said first body to be changed in its path until a path is attained thereby in which said values are constant.

5. Apparatus as defined in claim 4 wherein said comparing means comprises first correlating means for determining the ratio of the distance coordinate information of said signal to the distance coordinate information provided by said first tracking means and second correlating means for determining the difference between the values of said phase position coordinate information of said signal and the phase position coordinate information provided by said first tracking means, said difference between transmitted as guidance commands to said first body.

6. Apparatus as defined in claim 5, wherein said target image is provided by a fixed slotted disc and a rotatable slotted mask and wherein said deviation responsive means comprises a differential mechanism operatively associated with said programming means and said slotted disc, the occurrence of said deviation causing said differential mechanism to rotate said disc to displace said image.

7. Apparatus as defined in claim 6, wherein said first tracking means comprises an infrared radiation responsive system which produces a sinusoidal output in response to infrared radiation impinging thereon and wherein the signal from said programming means is a sinusoidal output, the amplitudes of said sinusoidal outputs respectively representing distance coordinates information, the phase relationship of said outputs representing phase position coordinates information.

8. Apparatus as defined in claim 7, wherein said programming means comprises an alternating current wave generator variable phase shifting means in circuit with the output of said generator and responsive to the action of said differential mechanism to shift the phase of said last named output in accordance with the rotation of said differential mechanism, and a variable resistor in circuit with the output of said generator and responsive to the action of said differential mechanism to vary the amplitude of said generator output, said phase shifter including variable resistance means, said variable resistance means and said variable resistor comprising sliders which are ganged and which are operatively connected to said differential mechanism.

9. Apparatus for guiding a first travelling body relative to a second travelling body, comprising
   first tracking means for tracking said first body to continuously obtain the coordinates of the travel path points of said first body and to provide such coordinates as output signals;
   first memory means connected to said first tracking means for recording the output signals thereof;
   second tracking means separate from said first tracking means for tracking said second body to continuously obtain the coordinates of the travel path points of said second body and to provide such coordinates and output signals;
   second memory means separate from said first memory means connected to said second tracking means for recording the output signals thereof;
   data handling means responsive to the output signals of said tracking means for determining the ratio of the value of a chosen coordinate of said second body to the value of said corresponding chosen coordinate of said first body and for comparing the tracking angles of said first and second bodies, the ratio of the values of the chosen coordinates being such that for each path point one path wherein a determined condition is met a path point is sought on the other path; and
   means responsive to a deviation from respective constant values for said ratio and said comparison for causing said first body to be changed in its path until a path is attained thereby in which said values are constant.

10. Apparatus for guiding a first travelling body relative to a second travelling body, comprising
    first tracking means for tracking said first body to continuously obtain the coordinates of the travel path points of said first body and to provide said coordinates as first path data:
    first memory means connected to said first tracking means for recording the first path data pointwise in accordance with the coordinates thereof;
    second tracking means separate from said first tracking means for tracking said second body to continuously obtain the coordinates of the travel path points of said second body and to provide said coordinates as second path data;
    second memory means separate from said first memory means connected to said second tracking means for recording the second path data pointwise in according with the coordinates thereof;
    data processing means connected to said first and second memory means for seeking in the path of travel of said second body a point having a predetermined coordinate in a given relation to the same coordinate of a point in the path of travel of said first body and for providing guidance commands from other coordinates of points in the paths of travel of said first and second bodies, the ratio of the values of the chosen coordinates being such that for each path point on one path wherein a determined condition is met a path point is sought on the other path; and
    transmitting means for transmitting said guidance commands to said first body.

11. Apparatus as claimed in claim 10, wherein said first tracking means comprises an infrared tracking system and said second tracking means comprises an optical sighting system.

References Cited

UNITED STATES PATENTS

| | | | |
|---|---|---|---|
| 2,971,437 | 2/1961 | Surtees | 244—3.11 |
| 3,001,186 | 9/1961 | Baltzer | 244—3.11 |
| 3,139,246 | 6/1964 | Willits | 244—3.16 |
| 3,156,435 | 11/1964 | Norton et al. | 244—3.14 |
| 3,162,757 | 12/1964 | Zaklad | 235—150.26 |

BENJAMIN A. BORCHELT, *Primary Examiner.*

T. H. WEBB, *Assistant Examiner.*